(12) United States Patent
Mukaide et al.

(10) Patent No.: US 9,223,338 B2
(45) Date of Patent: Dec. 29, 2015

(54) DISPLAY DEVICE

(75) Inventors: Masayoshi Mukaide, Kyoto (JP); Yu Ning Peng, Shenzhen (CN); Guo Li, Shenzhen (CN); Peng Lin, Shenzhen (CN)

(73) Assignees: SANYO ELECTRIC CO., LTD., Osaka (JP); SANYO TECHNOLOGY CENTER (SHENZHEN) CO., LTD., Shenzhen (CN)

( * ) Notice: Subject to any disclaimer, the term of this patent is extended or adjusted under 35 U.S.C. 154(b) by 41 days.

(21) Appl. No.: 13/594,115

(22) Filed: Aug. 24, 2012

(65) Prior Publication Data
US 2012/0314376 A1    Dec. 13, 2012

Related U.S. Application Data

(63) Continuation-in-part of application No. PCT/JP2011/053477, filed on Feb. 18, 2011.

(30) Foreign Application Priority Data

Feb. 26, 2010    (JP) ................................. 2010-042642

(51) Int. Cl.
*G06F 1/16*    (2006.01)
*G02F 1/1333*    (2006.01)

(52) U.S. Cl.
CPC ........ *G06F 1/1601* (2013.01); *G02F 1/133308* (2013.01); *G06F 1/1637* (2013.01); *G02F 2001/13332* (2013.01); *G02F 2001/133322* (2013.01)

(58) Field of Classification Search
CPC   G06F 1/1637; G06F 1/1601; G02F 1/133308

USPC ............. 361/679.01–679.39, 679.55–679.59; 349/58–60
See application file for complete search history.

(56) References Cited

U.S. PATENT DOCUMENTS 5,119,204 A * 6/1992 Hashimoto et al. ........... 348/794
6,151,207 A * 11/2000 Kim ......................... 361/679.26
(Continued)

FOREIGN PATENT DOCUMENTS

JP    2000-330481 A    11/2000
JP    2003-216056 A    7/2003
(Continued)

OTHER PUBLICATIONS

International Search Report mailed May 17, 2011 issued in corresponding International Application No. PCT/JP2011/053477.
(Continued)

*Primary Examiner* — Nidhi Thaker
(74) *Attorney, Agent, or Firm* — McDermott Will & Emery LLP

(57) ABSTRACT

The instant application describes a display device including a display panel; a first component forming the front portion of the cabinet; a second component forming the rear portion of the cabinet; a metal plate comprising a first flat portion parallel to the display surface of the display panel and a second flat portion perpendicular to the first flat portion; an engaging portion provided on the first flat portion, the engaging portion being engaged with the first component; a female screw portion to which a screw penetrating the second component is inserted, and a receiving portion provided on the first component to which the engaging portion is engaged.

1 Claim, 5 Drawing Sheets

(56) References Cited

U.S. PATENT DOCUMENTS

| | | | |
|---|---|---|---|
| 6,424,390 B1* | 7/2002 | Chen et al. | 349/58 |
| 6,930,734 B2* | 8/2005 | Lee | 349/58 |
| 6,975,368 B2* | 12/2005 | Lee | 349/58 |
| 6,992,884 B2* | 1/2006 | Minaguchi et al. | 361/679.21 |
| 7,492,421 B1* | 2/2009 | Kim et al. | 349/58 |
| 7,545,629 B1* | 6/2009 | Bauer et al. | 361/679.27 |
| 7,864,263 B2* | 1/2011 | Kim | 349/58 |
| 7,869,197 B2* | 1/2011 | Lee et al. | 361/679.01 |
| 8,059,228 B2* | 11/2011 | Wang | 349/60 |
| 8,339,536 B2* | 12/2012 | Sakamoto et al. | 349/58 |
| 8,434,251 B2* | 5/2013 | Lee et al. | 40/780 |
| 8,437,120 B2* | 5/2013 | Lee et al. | 361/679.01 |
| 2004/0189889 A1 | 9/2004 | Nitto et al. | |
| 2008/0238273 A1* | 10/2008 | Lee et al. | 312/223.6 |
| 2009/0225254 A1 | 9/2009 | Matsuzawa et al. | |
| 2010/0182531 A1* | 7/2010 | Teratani | 349/58 |

FOREIGN PATENT DOCUMENTS

| | | | | |
|---|---|---|---|---|
| JP | 2004-151610 | A | | 5/2004 |
| JP | 2004-302117 | A | | 10/2004 |
| JP | 2005-266396 | A | | 9/2005 |
| JP | 2005-286987 | A | | 10/2005 |
| JP | 2006-010996 | A | | 1/2006 |
| JP | 2006-162985 | A | | 6/2006 |
| JP | 2006162985 | A | * | 6/2006 |
| JP | 2008-033142 | A | | 2/2008 |
| JP | 2009-244845 | A | | 10/2009 |

OTHER PUBLICATIONS

Japanese Office Action issued in Japanese Application No. 2012-201759, dated Oct. 21, 2014.

* cited by examiner

DISPLAY DEVICE

CROSS-REFERENCE TO RELATED APPLICATIONS

This application is a continuation-in-part of Patent Cooperation Treaty Patent Application Number PCT/JP2011/053477, filed on Feb. 18, 2011, which claims priority from Japanese Patent Application Number 2010-042642, filed on Feb. 26, 2010, all of which are hereby incorporated by reference herein in their entirety.

TECHNICAL FIELD

The instant application relates to a connecting portion of the front cabinet and the back cabinet of the display device.

BACKGROUND

A display device includes a cabinet to accommodate a display panel. The cabinet is consisted by a front cabinet which covers the lateral side and partially the front side of the display panel and a back cabinet which covers the back side of the display panel.

When connecting the front cabinet and the back cabinet, one method is to penetrate a screw from the rear side of the back cabinet and this screw is screwed to the front cabinet which is a frame portion of the display panel. In this method, it is necessary to provide a clearance between the lateral side of the display panel and the front cabinet. Further, it is necessary to provide a female screw portion in the front cabinet. This hampers reducing the width of the frame part of the front cabinet.

There is a video wall display which is consisted by arranging a plurality of display devices in matrix to make a single large screen. In this video wall displays, it is desired to make the width of frame portion small in order to reduce the difference between the neighboring displaying portion of the display device.

SUMMARY

In one general aspect, the instant application describes a display device including a display panel; a first component forming the front portion of the cabinet; a second component forming the rear portion of the cabinet; a metal plate comprising a first flat portion parallel to the display surface of the display panel and a second flat portion perpendicular to the first flat portion; an engaging portion provided on the first flat portion, the engaging portion being engaged with the first component; a female screw portion to which a screw penetrating the second component is inserted, and a receiving portion provided on the first component to which the engaging portion is engaged.

BRIEF DESCRIPTION OF THE DRAWINGS

The figures depict one or more implementations in accord with the present teachings, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without exemplary details. In other instances, well known methods, procedures, components, and/or circuitry have been described at a relatively high-level, without detail, in order to avoid unnecessarily obscuring aspects of the present concepts. In exchange for the present disclosure herein, the Applicants desire all patent rights described in the claims. Therefore, the patent rights are not intended to be limited or restricted by the following detailed description and accompanying figures.

Figure 1:
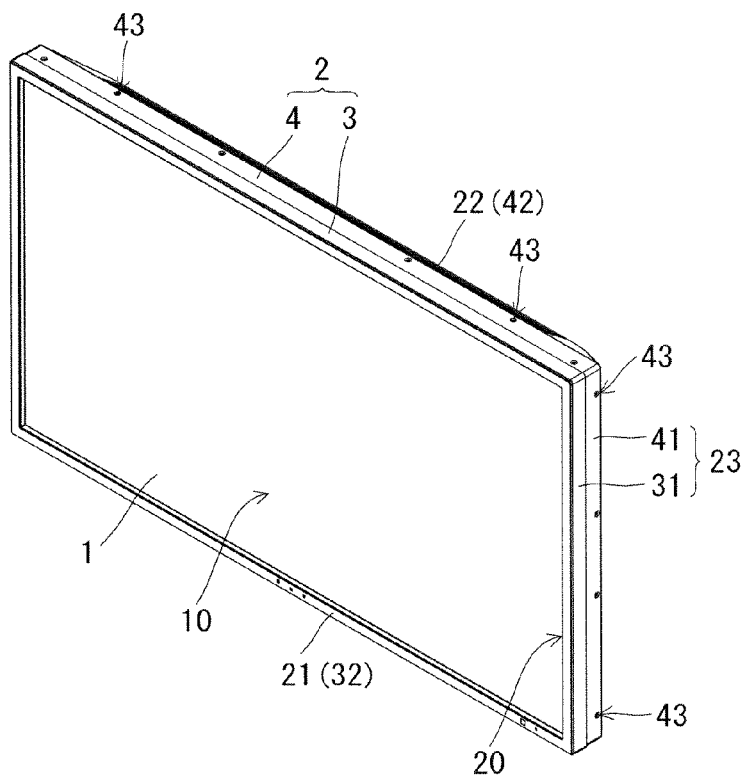
FIG. 1 illustrates a front perspective view of the display device 100.

FIG. 1 illustrates a front perspective view of the display device 100. The display device 100 has a LCD (Liquid Crystal Display) panel 1, the size of which is longer in the horizontal side compared to vertical side, and a cabinet 2 which accommodates the panel 1. The front side of the cabinet 2 has an opening 20 so as to make displaying surface 10 of the LCD panel 1 viewable.

Figure 2:
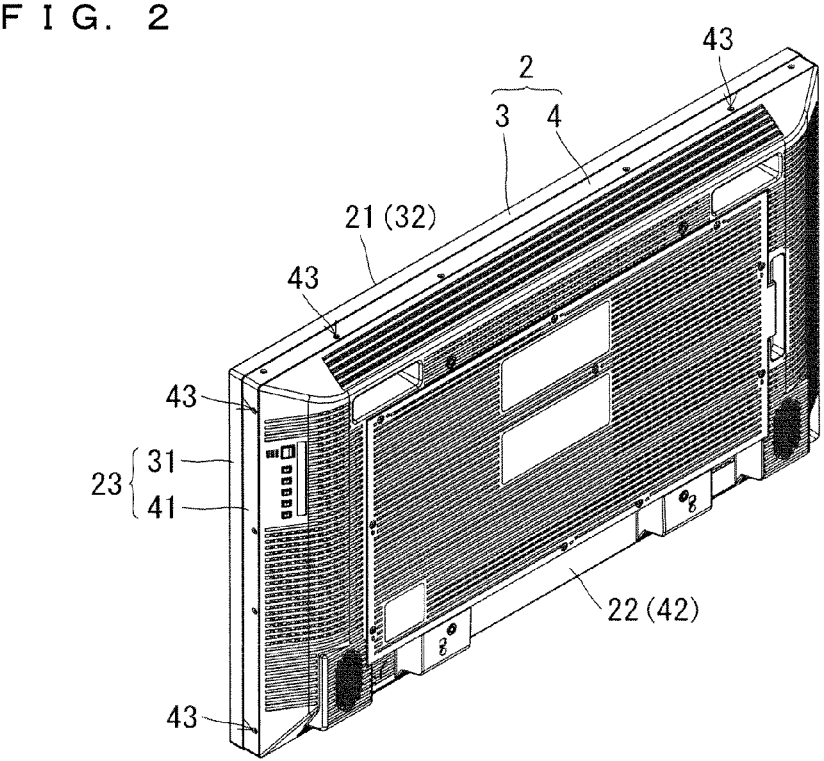
FIG. 2 illustrates a rear perspective view of the display device 100.

As shown in FIGS. 1 and 2, the cabinet 2 is consisted by connecting the front cabinet 3 and back cabinet 4.

The front cabinet 3 is formed by a lateral frame portion 31 which covers the lateral side of the LCD panel 1, and the front frame portion 32 which covers the front peripheral portion of the LCD panel 1. The back cabinet 4 is formed by a side portion 41 which covers the lateral side of the LCD panel 1 and the back portion 42 which covers the back side of the LCD panel.

Figure 3:
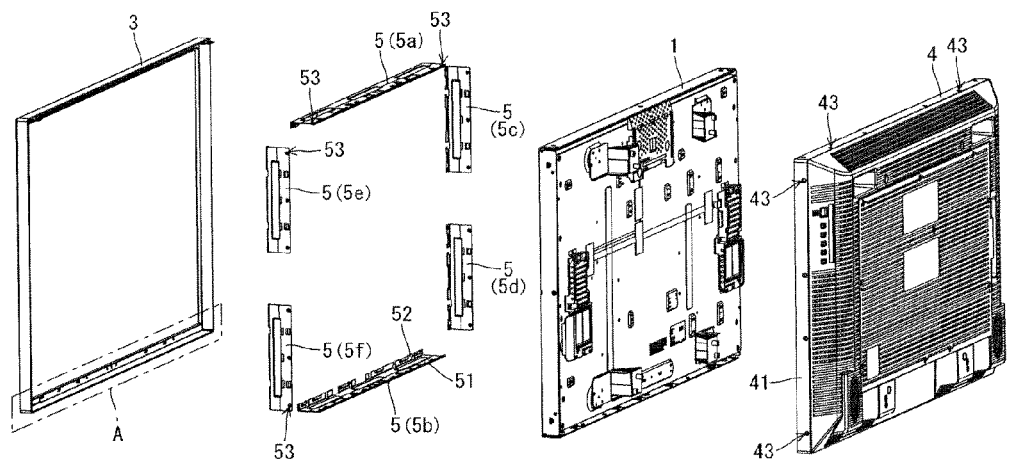
FIG. 3 illustrates an exploded view of the display device 100.
Figure 4:
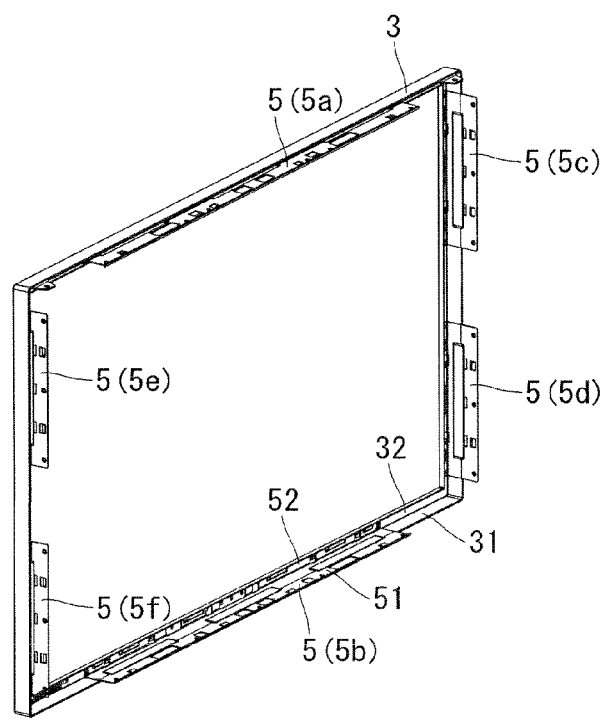
FIG. 4 illustrates a perspective view showing the front cabinet and the metal plate.

As shown in FIG. 3, a plurality of metal plate 5 is arranged inside the cabinet 2. The metal plate 5a is arranged in the upper side, metal plate 5b is arranged in the lower side, the metal plates 5c and 5d are arranged in the left side and the metal plates 5e and 5f are arranged in the right side (see FIG. 4 also).

Figure 5:
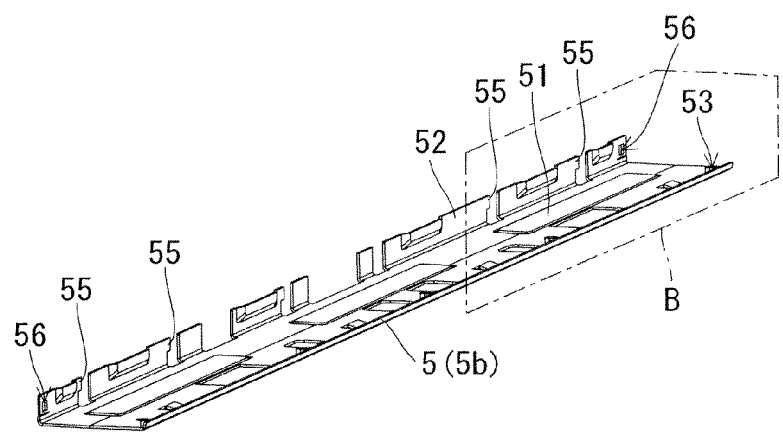
FIG. 5 illustrates a perspective view of the metal plate when arranged at the lower side of the front cabinet.

As shown in FIG. 5, each of the metal plate 5 has a first flat portion 51 and the second flat portion 52. The portions 51 and 52 are formed perpendicular to each other. When the metal plate 5 is assembled to the front cabinet 3, the first flat portion 51 faces the side frame portion 31 of the front cabinet 3, the second flat portion 52 daces the front frame portion 32.

Figure 6:
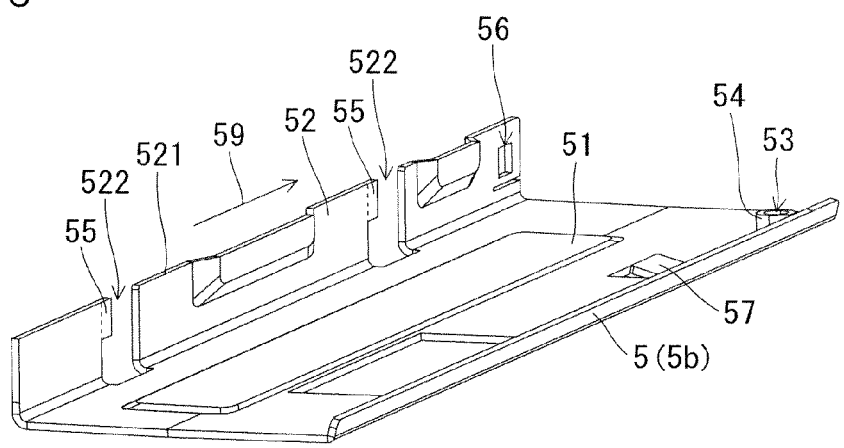
FIG. 6 illustrates an enlarged view of the area B in FIG. 5.
Figure 7:
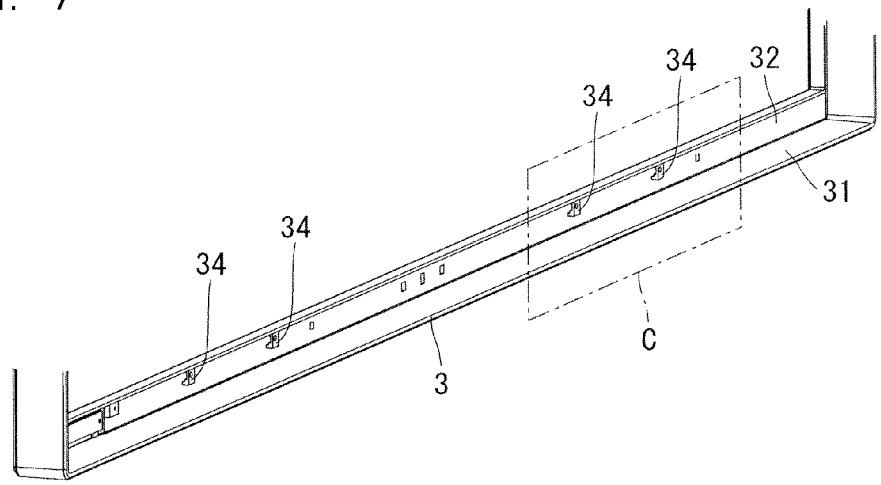
FIG. 7 illustrates an enlarged view of the area A in FIG. 3.

As shown in FIGS. 1 to 3, in the side portion 41 of the back cabinet 4, a plurality of penetrating holes 43 for inserting the screw components are provided. As shown in FIGS. 5 and 6, in the first flat portion 51 of the metal plate 5, a plurality of female screw components 53 are provided.

The first flat portion 51 is extended from the front side to the back cabinet 4 side. In the back side of the flat portion 51, as shown in FIG. 6, protrusion 54 is formed in an area facing the penetrating holes 43. The tip portion of the female screw portion 53 is formed in the protrusion 54.

As shown in FIG. 6, an engaging portion 55 is formed on the second flat portion 52 of the metal plate 5. In the second flat portion 52, a slit 522 which extends from the tip 521 of the portion 52 to the first flat portion 52 is provided. In the edge of the slit 522, engaging portion 55 is provided toward the direction 59 (see FIG. 6). In the second flat portion 52 of the metal plates 5a and 5b, four engaging portions 55 are provided thereon, as shown in FIG. 5. In the second flat portion 52 of the metal plates 5c to 5f, two engaging portions 55 are provided thereon.

Figure 8:
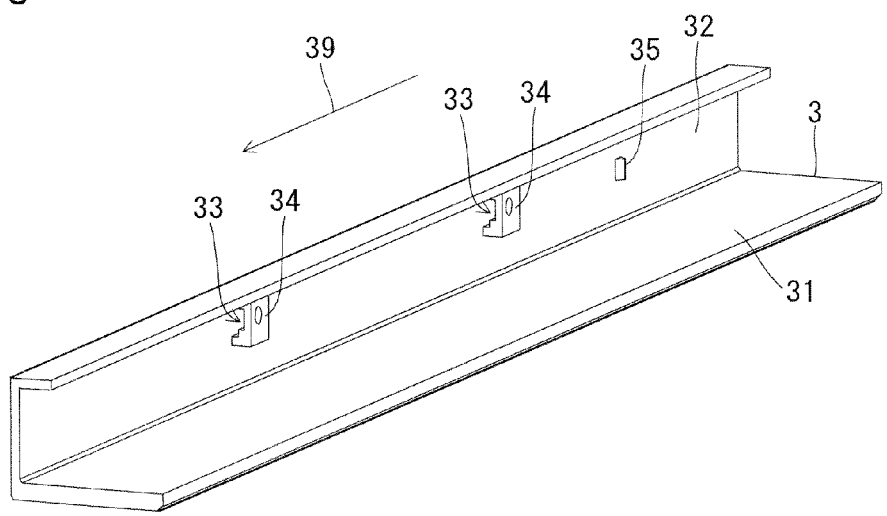
FIG. 8 illustrates an enlarged view of the area C in FIG. 7.
Figure 9:
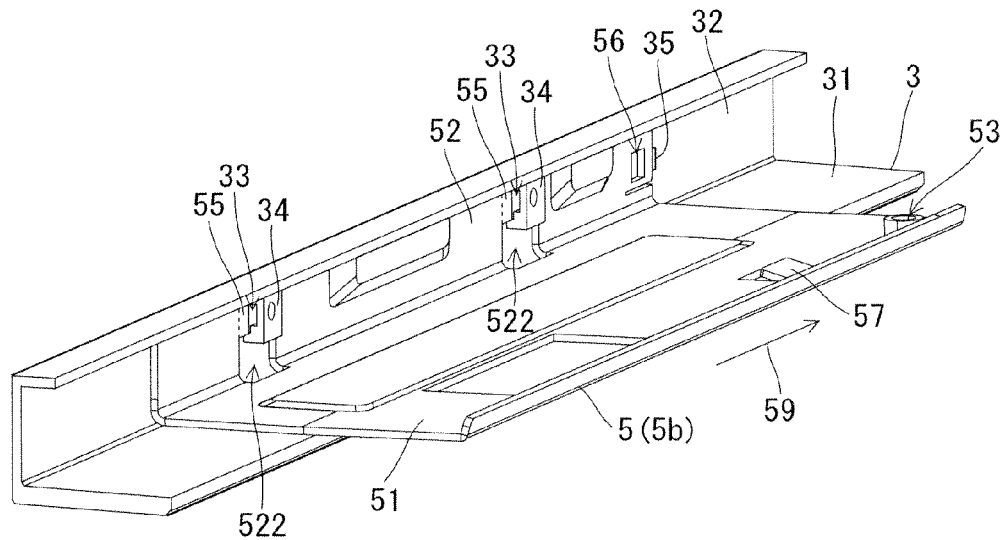
FIG. 9 illustrates a perspective view showing a first assembling step of the metal plate and the front cabinet.

As shown in FIG. 8, in the front frame portion 32 of the front cabinet 3, a receiving portion 33, to which the engaging portion 55 is engaged, is formed thereon. In the inner side of the front frame portion 32, a protrusion 34 is formed. In the protrusion 34, a plurality of receiving portions 33 are provided in the direction 39 (see FIG. 8). In the frame portion 32, receiving portions 33 are provided in 16 places corresponding to 16 engaging portions 55 provided on the metal plate 5.

As shown in FIG. 8, in the front frame portion 32 of the front cabinet 3, a triangular prism shaped protrusion 35 is provided so as the metal plate 5 contacts this portion 35. In the front frame portion 32, two protrusions 35 are provided.

As shown in FIG. 6, in the second flat portion 52 of the metal plate 5, a receiving portion 56 is provided thereon. When the engaging portion 55 of the metal plate 5 and the receiving portion 33 of the front frame portion 32 are engaged, the protrusion 35 engages to the receiving portion 56.

When engaging the engaging portion 55 of the metal plate 5 and the receiving portion 33 of the front frame portion 32, first, the protrusion 34 of the front frame 32 is penetrated to the slit 522 of the metal plate 5. Thereby, the surface of the second flat portion 52 of the metal plate 5 is overlapped to inner surface of the front frame 32. Hereby, the receiving portion 33 formed on the protrusion 34 and the engaging portion 55 of the metal plate 5 faces each other. The receiving unit 56 of the metal plate 5 is formed away from the protrusion 35.

Figure 10:
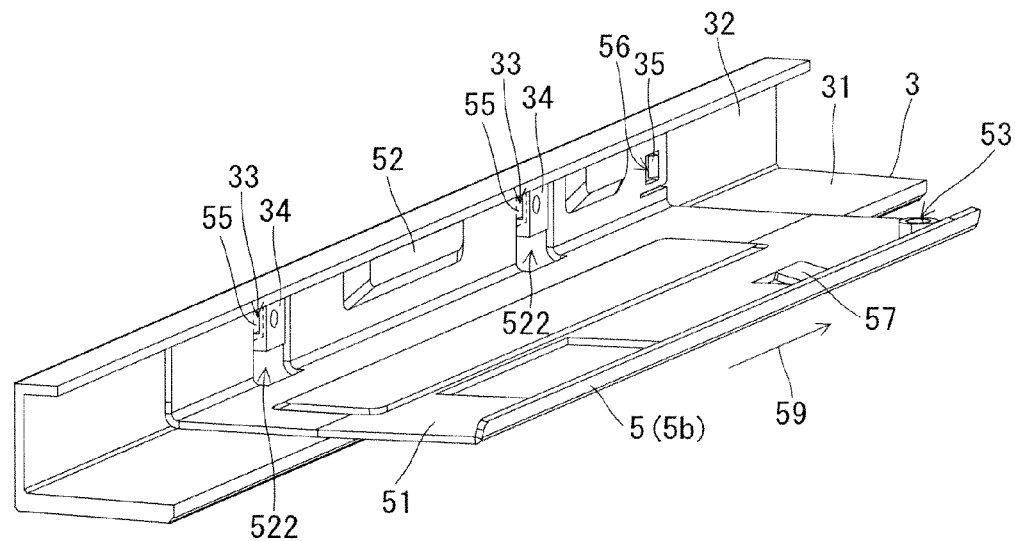
FIG. 10 illustrates a perspective view showing a second assembling step of the metal plate and the front cabinet.

Then, as shown in FIG. 10, by sliding the metal plate 5 toward the direction 59, the engaging portion 55 of the metal plate 5 is inserted to the receiving portion 33 of the front frame 32. Thereby, the engaging portion 55 and the receiving portion 33 are engaged.

Since the protrusion 35 is fitted and engaged to the receiving portion 56, the engagement between the engaging portion 55 in the metal plate 5 and the receiving portion 33 in the front frame 32 is strengthen. Thereby, the position of the metal plate 5 is stable against the front cabinet 3. This can ease the assembling of the front cabinet 3 and the back cabinet 4, for example, insertion of the screwing component to the female screw portion 53 of the metal plate 5 is eased.

In the first flat portion 51 of the metal plate 5, a bent portion 57 is formed in its rear (back cabinet 4) side as shown in FIG. 6. The bent portion 57 is hooked to the rear surface of the LCD panel 1.

By this, the bent portion 57 of the metal plate 5 is hooked to the rear side of the LCD panel 1 in a state the metal plate 5 is connected to the front cabinet 3. Thereby, the metal plate 5 is preliminary fixed to the LCD panel 1. This eases the assembling of the front cabinet 3 and the rear cabinet 4.

It is desirable that the bent portion 57 has elasticity. By this, the LCD panel 1 is biased forward due to an elastic force of the bent portion 57. Thereby, the front cabinet 3 is fixed to the LCD panel 1 before the front cabinet 3 and the back cabinet 4 are connected. Thereby, the assembling of the front cabinet 3 and the back cabinet 4 is eased.

According to the above structure, it is unnecessary to provide female screw portion to the front frame 32 as in the conventional display devices. Thereby, it is possible to make width of the front frame 32 smaller.

Since the engaging structure consisted by the engaging portion 55 and the receiving 33 is provided in a space between the second flat portion 52 of the metal plate 5 and the frame portion 32 of the front cabinet 3, it is possible to make a clearance between the side surface of the LCD panel 1 and the side wall 23 of the cabinet 2 small. By this, the width of the frame 32 can be made small.

The above described display device can be applied to a video wall, which is consisted by a plurality of display devices aligned in matrix. Since the width of the frame can be made small in the above display device, it can make the distance between the display screens of the neighboring display devices in the video wall.

In the above described display devices, an external force applied to the cabinet 2 can be absorbed by metal plate 5. The metal plate 5 is L-shaped and it is hard to bend. Thus, the cabinet 2 is hardly bent by an external force. Further, the metal plates 5a, 5b are extended along the upper wall and lower wall of the cabinet 2 respectively. Thus, the upper wall and lower wall of the cabinet 2 are strengthening.

By connecting the back cabinet 4 and the metal plate 5 by inserting a screw to the female screw component 53 of the metal plate 5, the first flat portion 51 of the metal plate 5 is pulled toward the side portion 41 of the back cabinet 4. Since the metal plate 5 is L-shaped, by this, the second flat portion 52 of the metal plate 5 is pulled toward the back cabinet 4. This can ease the frame portion 32 of the front cabinet 3 contacting the display screen 32.

In the first flat surface 51 of the metal plate 5, the protruding portion 54 is formed its rear side, and the female screw portion 53 is formed in the protruding portion 54. Thus, the metal plate 5 and the back cabinet 4 can be connected strongly without making the space between the side surface of the LCD panel 1 and the cabinet 2.

Other implementations are contemplated. For example, above implementation can be applied not only to the display device having the LCD panel 1, but also to the display device having a plasma display panel, OLED display panel, or Electro-Luminescence panels etc.

The engaging structure consisted by the engaging portion 55 and the receiving portion 33 may be provided between the first flat portion 51 of the metal plate 5 and the side surface 31 of the front cabinet 3. In this case, the metal plate 5 does not have to be L-shaped, but may be a plate-like structure.

What is claimed is:

1. A display device comprising: a display panel having a display surface; a cabinet for housing the display panel; a first component forming a front portion of the cabinet and a side frame portion consisting of a part of a side of the cabinet, the first component having a frame portion enclosing the display surface of the display panel; a second component forming a rear portion of the cabinet, the second component being connectable to the first component; a metal plate having a first flat portion perpendicular to the display surface of the display panel and a second flat portion parallel to the display surface of the display panel, the first flat portion facing a side of the display panel and provided along the side frame portion and the second flat portion provided along the frame portion and being bended into an L-shape toward the direction of the display surface of the display panel; an engaging portion provided on the second flat portion of the metal plate and engageable with the first component; a female screw portion formed in the first flat portion and engageable with a screw to secure the second component; and a receiving portion provided on the first component, the receiving portion being engaged with the engaging portion of the metal plate, wherein the engaging portion is engaged with the receiving portion and the screw is screwed into the female screw portion so that the first component is connected to the second component, and the display panel is put between the first component and the second component and thereby fixed, wherein the metal plate is expanded from the area facing the side of the display panel further to the second component, the metal plate being formed in the range from the area facing the side of the display panel to the area of the second component with a bending portion having elasticity, wherein a part of the metal plate is bended to a rear side, and wherein the bending portion is hooked to a rear portion of the display panel.

\* \* \* \* \*